Nov. 6, 1934.                J. S. PARSONS                 1,979,703
                          SYSTEM OF DISTRIBUTION
                          Filed June 17, 1932      4 Sheets-Sheet 1

Nov. 6, 1934.    J. S. PARSONS    1,979,703
SYSTEM OF DISTRIBUTION
Filed June 17, 1932    4 Sheets-Sheet 2

Fig. 2.

WITNESSES:

INVENTOR
John S. Parsons.
BY 
ATTORNEY

Patented Nov. 6, 1934

1,979,703

UNITED STATES PATENT OFFICE 1,979,703

SYSTEM OF DISTRIBUTION

John S. Parsons, Swissvale, Pa., assignor to Westinghouse Electric & Manufacturing Company, East Pittsburgh, Pa., a corporation of Pennsylvania Application June 17, 1932, Serial No. 617,830

22 Claims. (Cl. 175—294)

My invention relates to distribution systems and particularly to systems in which a plurality of feeders transmit power from one or more sources to a common distribution circuit.

Although not limited thereto, my invention is particularly applicable to alternating current distribution systems in which a plurality of feeders connected to one or more high-voltage sources by means of circuit breakers, transmit power through step-down transformers and automatically controlled network switches to a common low voltage distribution network. In such systems, because of the low voltage and the relatively large current carrying capacity of the secondary network, it is practicable and desirable to clear faults on the secondary network by permitting them to burn clear. Inasmuch as the distribution transformers are included between the secondary network and the source or sources, their impedance acts to limit the flow of power which may result from a fault on the secondary network. Also, because of the low voltage, an arc cannot be sustained after the metallic connection constituting the fault has burned away.

On the other hand, faults in the feeders connecting the source or sources and the high voltage sides of the transformers, cannot safely be cleared by burning clear, as the feeder voltage is sufficient to maintain an arc after the metallic fault has burned away. Furthermore, the current carrying capacity of the high voltage apparatus is comparatively small, and the power flow to the fault is not limited by the impedance of the transformers. Unless the circuit breakers are opened to interrupt the power flow to faults on the feeders, therefore, permanent injury to high voltage apparatus or conductors associated with the feeder circuits may result.

In such systems, upon the occurrence of a fault on a feeder, power is fed to the fault from the source connected to the feeder and also in reverse direction from the network circuit to which the feeder is connected. In order to clear the fault, therefore, it is necessary to open the feeder circuit at both ends. A complicated and expensive protective system is necessary to accomplish this operation satisfactorily and at the same time maintain uninterrupted service on the distribution circuit.

It is an object of my invention to provide protective means for a distribution system having a plurality of feeders, which shall not operate to preserve absolute continuity of service but which shall require a minimum of apparatus for clearing faults in a reliable manner.

Another object of my invention is to provide novel and simple automatic reclosing circuit breaker apparatus.

Another object of my invention is to provide novel and simple means for controlling a plurality of circuit breakers interconnecting a plurality of circuits of a distribution system, in such a manner that upon the occurrence of a fault, the circuit breakers shall be automatically tripped open and reclosed in a sequence which results in the final disconnection of the circuit upon which the fault exists and the operative interconnection of the remaining circuits of the system.

A further object of my invention is to provide novel and simple means for controlling the circuit breakers of an alternating current distribution system in such manner that substantially all faults on the low voltage circuits shall be burned clear but, upon the occurrence of a fault on a high-voltage circuit, the circuit breakers shall be automatically tripped open and reclosed in a sequence which results in the final disconnection of the high-voltage circuit upon which the fault exists and the operative interconnection of the remaining circuits of the system.

Other objects of my invention will become apparent from the following detailed description taken in connection with the accompanying drawings, in which.

Figure 1:
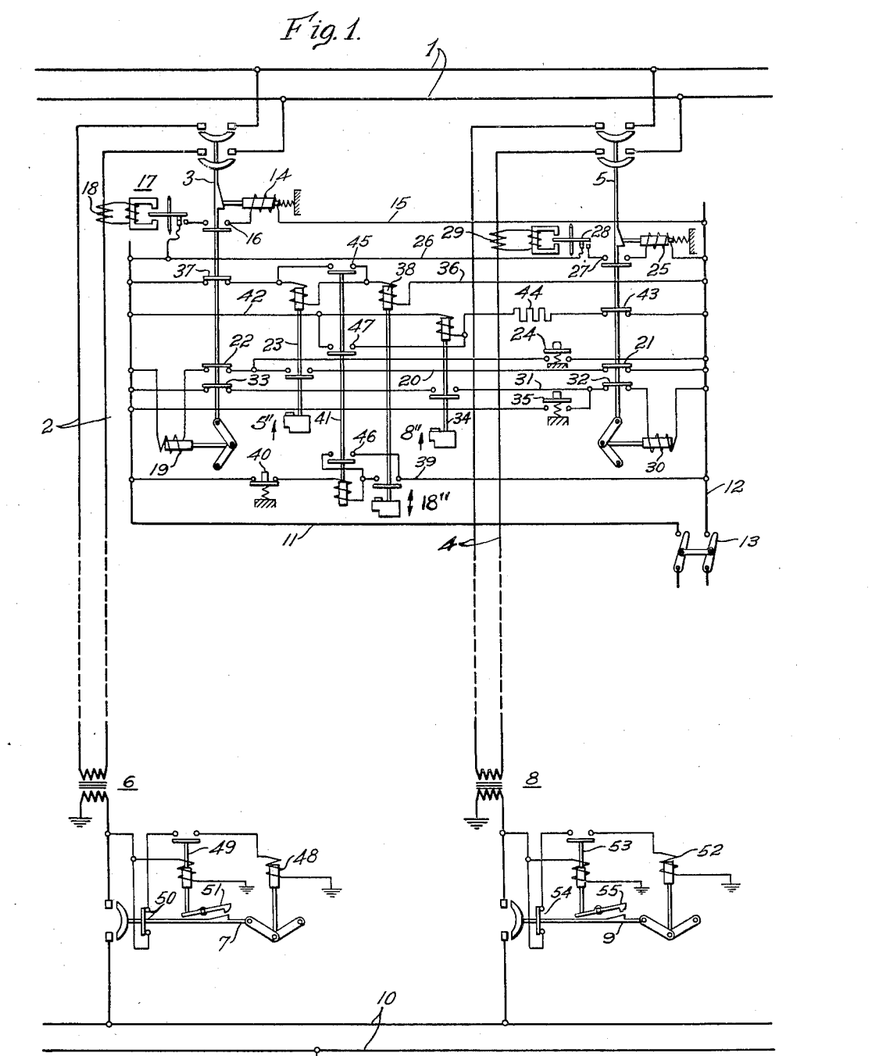
Figure 1 is a diagrammatic view of an automatic reclosing circuit breaker system embodying my invention.

Referring to Fig. 1 of the drawings, which shows diagrammatically an embodiment of my invention as applied to an alternating-current distribution system, which for simplicity, I have illustrated as single phase, a high-voltage supply circuit 1, which may be a generating station or substation bus, is arranged to be connected to a pair of feeders 2 and 4 by means of a pair of circuit breakers 3 and 5, respectively. The feeders 2 and 4 are connected to the high voltage sides of banks of transformers indicated diagrammatically at 6 and 8. The low voltage sides of the banks of transformers 6 and 8 are connected through network switches 7 and 9, respectively, to a low voltage distribution or network circuit 10.

A pair of supply conductors 11 and 12, are provided for supplying the direct-current used in the control circuits. The supply conductors 11 and 12 may be connected to a suitable direct-current source (not shown) by means of a switch 13.

The circuit breaker 3 is provided with a trip coil 14, connected to the supply conductors 11 and 12 in a trip circuit 15 which includes front pallet contact members 16 of the circuit breaker 3 and contact members of any suitable fault responsive means 17, which I have illustrated as an over-current relay of the induction disc type. The over-current relay 17 preferably operates with a time delay and may be of the definite time-element, inverse time-element or inverse time-element with definite minimum time limit types known in the art. The over-current relay 17 is energized in accordance with the current in feeder 2 by means of a current transformer 18, and is adjusted (in the usual manner) to close at the expiration of a time interval when the current in the feeder 2 exceeds a predetermined value.

The circuit breaker 3 is provided with a closing coil 19, connected to the supply conductors 11 and 12 in a closing circuit 20, which includes back pallet contact members 21 of circuit breaker 5, contact members of a timing relay 23, and back pallet contact members 22 of circuit breaker 3. A push button 24 is provided for energizing the closing coil 19, independently of the pallet contact members 21 and the timing relay 23.

The circuit breaker 5 is provided with a trip coil 25 which is connected to the supply conductors 11 and 12 in a trip circuit 26 which includes front pallet contact members 27 of the circuit breaker 5 and the contact members of an over-current relay 28, similar to the over-current relay 17.

The over-current relay 28 is energized in accordance with the current in a feeder 4 by means of a current transformer 29, and is adjusted to close at the expiration of a time interval when the current in the feeder 4 exceeds a predetermined value.

The circuit breaker 5 is provided with a closing coil 30 connected to the supply conductors 11 and 12 in a closing circuit 31 which includes back pallet contact members 32 of circuit breaker 5, back pallet contact members 33 of circuit breaker 3 and the contact members of a timing relay 34.

A push button 35 is provided for energizing the closing coil 30, independently of pallet contact members 33 and the timing relay 34.

The coil of the timing relay 23 is connected to the supply conductors 11 and 12 in a timing circuit 36 which includes back pallet contact members 37 of circuit breaker 3 and the coil of a time-delay relay 38.

The contact members of the time-delay relay 38 are included in a lock-out circuit 39 which extends from supply conductor 11 through a normally closed push button 40, the coil of a lock-out relay 41 and the contact members of the time delay relay 38 to supply conductor 12.

The coil of the timing relay 34 is connected to supply conductors 11 and 12 in a timing circuit 42 which includes back pallet contact members 43 of the circuit breaker 5 and a resistor 44, for limiting the current in the circuit upon the short-circuiting of the coil of timing relay 34.

The lock-out relay 41 is provided with contact members 45 for short-circuiting the coil of timing relay 23, with contact members 46 for completing a holding circuit for itself independently of the time element relay 38, and with contact members 47 for short circuiting the coil of timing relay 34.

The network switch 7 is provided with a closing coil 48 connected to be energized from the low-voltage side of the transformer bank 6, in a circuit which includes contact members of a low voltage mechanism 49 and back pallet contact members 50 of the network switch 7. The low-voltage mechanism 49 serves as a relay and also as a mechanical device for tripping the latch mechanism 51 of the network switch 7 in opening.

Similarly, the network switch 9 is provided with a closing coil 52 connected to be energized from the low voltage side of transformer bank 8, in a circuit which includes contact members of a low-voltage mechanism 53 and back pallet contact members 54 of the network switch 9. The low-voltage mechanism 53 is arranged to trip the latch mechanism 55 of the network switch 9 in opening.

The low-voltage mechanisms 49 and 53, associated with the network switches 7 and 9, respectively, are designed to close when the voltage at the secondary terminals of transformer banks 6 and 8 exceeds a predetermined percentage of normal voltage, for example 80%, and to drop out when the voltage at the secondary terminals of transformer banks 6 and 8 falls below a predetermined minimum, for example 15% of normal voltage.

The timing relays 23 and 34 are of the delayed-closing, instantaneous opening type, and the time-delay relay 38 is of the delayed-closing delayed-opening type. The time elements of the timing relays 23 and 34 are different, and the time element of the time-delay relay 38 is greater than the time-elements of either timing relay 23 or 34. For example, if the time element of relay 23 is 5 seconds, the time element of timing relay 34 may be 8 seconds and the time element of time-delay relay 38 may be 18 seconds. With the time elements so chosen, the timing relay 23 will close 5 seconds after energization and will open instantaneously upon deenergization, the timing relay 38 will close 8 seconds after energization and will open instantaneously upon de-energization; and the time-delay relay 38 will require 18 seconds to complete either an opening or a closing operation. The time-delay relay 38 is of such type that brief interruption of its energizing circuit does not re-set its timing mechanism.

It will be understood that the time-element values 5, 8 and 18 seconds, mentioned above, are arbitrarily chosen for illustrative purposes only, and that in practice values widely different therefrom may be used. It will also be understood that although I have illustrated the relays 23, 34 and 38 as dashpot relays, these relays may be of any of a number of time-element types known in the art.

The operation of the apparatus shown in Fig. 1 may be set forth as follows: Assuming that the circuit breakers 3 and 5, network switches 7 and 9, the relays 23, 34, 38 and 41 and the switch 13 are all open, as shown in the figure, the switch 13 is closed to prepare the apparatus for automatic operation.

Upon closure of switch 13, the timing circuits 36 and 42 are energized, and the timing relays 23 and 34 and the time delay relay 38 commence to operate to their closed positions.

At the expiration of a five second interval, the timing relay 23 is closed to complete the closing circuit 20, and the circuit breaker 3 closes.

The circuit breaker 3, in closing, latches itself in; connects the feeder 2 to the supply circuit 1; partially completes the trip circuit 15 by closure of its pallet contact members 16; interrupts the closing circuit 20 by the opening of its pallet contact members 22; opens its pallet contact members 33 in the closing circuit 31, and interrupts the timing circuit 36 by the opening of its pallet contact members 37.

Upon connection of the feeder 2 to the supply circuit 1, the transformer bank 6 is energized, and the low voltage mechanism 49 closes. The low voltage mechanism 49, in closing, releases the latch mechanism 51 and completes a circuit through the closing coil 48 of network switch 7. In response to completion of this circuit, the network switch 7 closes to connect the low voltage side of the transformer bank 6 to the network circuit 10, and the latch mechanism 51 operates to latch the network switch 7 in closed position. The network switch 7, in closing, interrupts the circuit through its closing coil 48 by the opening of its pallet contact members 50.

The interruption of the timing circuit 36, during the closing operation of circuit breaker 3, as described above, deenergizes the timing relay 23 and the time delay relay 38. The timing relay 23 immediately opens to interrupt the closing circuit 20, and the time delay relay 38, moves, under control of its timing means, toward fully open position.

At the expiration of an 8 second interval after closure of switch 13, the timing relay 34 closes. However, closure of the time element relay 34 does not complete the closing circuit 31, as the latter circuit is now open at pallet contact members 33 of circuit breaker 3. The circuit breaker 5 accordingly remains open.

In order to close the circuit breaker 5, the push button 35 is pressed. The closing coil 30 is accordingly energized and the circuit breaker 5 closes and is latched in.

The circuit breaker 5 in closing, connects the feeder 4 to the supply circuit 1; partially completes the trip circuit 26 by closure of its pallet contact members 27; opens its pallet contact members 21 and 32 in the closing circuits 20 and 31, respectively; and interrupts the timing circuit 42 by the opening of its pallet contact members 43.

Upon connection of the feeder 4 to the supply circuit 1, the transformer bank 8 becomes energized, and the low-voltage mechanism 53 closes. The low-voltage mechanism 53 in closing, completes a circuit for the closing coil 52 of network switch 9 and releases the latch mechanism 55. In response to completion of the circuit for the closing coil 52, the network switch 9 closes to connect the low voltage side of the transformer bank 8 to the network circuit 10, and the latch mechanism 55 operates to latch the network switch 9 in closed position.

The interruption of the timing circuit 42 during the closing operation of circuit breaker 5, as described above, causes the timing relay 34 to open and interrupt the closing circuit 31.

The circuit breakers 3 and 5 and the network switches 7 and 9 are now all closed, and the relays 23, 34, 38 and 41 are all in open position.

If a fault now occurs on feeder 2, power is fed to the fault through the feeder 2, and also through the feeder 4, transformer bank 8, network circuit 10 and transformer bank 6. The over-current relays 17 and 28, at the expiration of their time elements, accordingly close to complete the trip circuits 15 and 26, respectively. Upon completion of the trip circuits 15 and 26 the circuit breakers 3 and 5 trip open.

The circuit breaker 3 in opening, disconnects the feeder 2 from the supply circuit 1; opens its pallet contact members 16; closes its pallet contact members 22 and 33 and completes the timing circuit 36 by the closure of its pallet contact members 37. The circuit breaker 5, in opening disconnects the feeder 4 from the supply circuit 1; opens its pallet contact members 27; closes its pallet contact members 21 and 32 and completes the timing circuit 42 by the closure of its pallet contact members 43.

As the feeders 2 and 4 are now both disconnected, the transformer banks 6 and 8 and the network circuit 10 are de-energized, and the low voltage mechanisms 49 and 53 open to trip the network switches 7 and 9. The network switches 7 and 9 accordingly open.

As the timing circuits 36 and 42 are now both complete, the timing relays 23 and 34 and the time-delay relay 38 commence to operate to closed positions, under control of their respective time element devices.

At the expiration of 5 seconds after the opening of circuit breakers 3 and 5, the timing relay 23 closes to complete the closing circuit 20, and the circuit breaker 3 closes in a manner previously described.

If the fault on feeder 2 has cleared, the circuit breaker 3 remains closed. At the expiration of an 8 second interval, the timing relay 34 closes, but since the closing circuit 31 is open at pallet contact members 33 of the circuit breaker 3, the circuit breaker 5 does not re-close automatically, and must be closed manually by operation of the push button 35, in the manner previously described.

Assuming however, that at the time the circuit breaker 3 automatically recloses, the fault on feeder 2 has not cleared, the operation is as follows:

Upon the automatic-reclosure of circuit breaker 3, the timing circuit 36 is interrupted and the timing relay 23 immediately opens. The time delay relay 38 does not immediately return to fully open position because of the action of its retarding device.

Meanwhile, as the fault on feeder 2 has not cleared, one or more of the over-current relays 17 again closes to complete the trip circuit 15 and to thereby reopen the circuit breaker 3. The circuit breaker 3, in re-opening, again completes the timing circuit 36, and the timing relay 23 and the time delay relay 38 again commence to operate to closed positions. As the timing relay 23 is starting from fully open position, five seconds will be required for its closure, but as the time delay relay 38 is partially closed, approximately 13 seconds of its full time period of 18 seconds will be required to complete its closure.

At the expiration of an 8 second interval after the initial opening of both circuit breakers 3 and 5, the timing relay 34 closes. As the pallet contact members 33 of circuit breakers 3 and 32 of circuit breaker 5 are now both closed, the closing circuit 31 is completed and the circuit breaker 5 automatically recloses and is latched in. As the network switch 7 is now open, the feeder 4 may supply power to the network circuit 10 over a path clear of the faulty feeder 2.

At the expiration of a ten second interval after the initial opening of the circuit breakers 3 and 5, the timing relay 23 again closes. As the pallet contact members 21 of circuit breaker 5 are now open, however, the closure of the timing relay 23 does not complete the closing circuit 20, and the circuit breaker 3 remains open.

At the expiration of an 18 second interval after the initial opening of the circuit breakers 3 and 5, the time delay relay 38 closes to complete the lock-out circuit 39. Upon completion of the lock-out circuit 39, relay 41 closes to short-circuit the coil of the timing relay 23 by means of its contact members 45, to complete a holding circuit for itself through its contact members 46 and to short-circuit the coil of the timing relay 34 by means of its contact members 47.

The timing relays 23 and 34 immediately drop out. As the closing circuit 20 cannot be completed until the lock-out relay 41 is opened, the circuit breaker 3 is locked out, and the fault on feeder 2 can now be repaired. If, in the meantime, a fault occurs on the feeder 4, the over-current relay 28 operates to complete the trip circuit 26 and the circuit breaker 5 is tripped open. As the closing circuits 20 and 31 are now open at contact members of the timing relays 23 and 34, respectively, no automatic re-closing operations can take place.

When the fault on feeder 2 has been repaired, the push-button 40 may be pressed to open the lock-out circuit 39 and to thereby open the lock-out relay 41, and the push-button 24 may be pressed to cause the closure of circuit breaker 3.

Assuming that the circuit breakers 3 and 5 and the network switches 7 and 9 are closed and that a fault occurs on feeder 4, the operation is as follows: Power is fed to the fault through the feeder 4 and also through the feeder 2, transformer bank 6, network circuit 10 and the transformer bank 8.

The circuit breakers 3 and 5 now trip open in the manner previously described. After a 5 second interval circuit breaker 3 automatically re-closes. As the network switches 7 and 9 are open in response to the opening of both circuit breakers 3 and 5, the reclosure of circuit breaker 3 causes the reclosure of network switch 7. The network circuit 10 is now fed from the supply circuit 1 through the feeder 2 and transformer bank 6, in a path clear of the faulty feeder 4. The circuit breaker 3 accordingly remains closed.

As the closing circuit 31 is open at pallet contact members 33 of circuit breaker 3, the circuit breaker 5 cannot reclose in response to closure of timing relay 34 at the expiration of its 8 second time interval.

The faulty feeder 4 may now be repaired, and the circuit breaker 5, after repairs have been completed, may be reclosed by operation of the push button 35.

Should a fault occur upon the network circuit 10 of sufficient severity to open both circuit breakers 3 and 5, or upon the occurrence of a fault involving both feeders 2 and 4, the operation is as follows:

Both circuit breakers 3 and 5 trip open in the manner previously described. At the end of five seconds, the circuit breaker 3 re-closes and again trips open, in the manner previously described. At the end of 8 seconds, the circuit breaker 5 recloses and again trips open. At the expiration of a 10 second interval after the initial opening of circuit breakers 3 and 5, the circuit breaker 3 again recloses and again trips open. Five seconds later the circuit breaker 3 again recloses and again trips open, and a second later the circuit breaker 5 recloses and again trips open. At the end of an 18 second interval after the initial opening of circuit breakers 3 and 5, the lockout relay 41 closes in the manner previously described, and prevents the automatic re-closure of either circuit breaker 3 or 5. It will be understood that if at any time during this 18 second interval, the fault has cleared, the first circuit breaker 3 or 5 to close thereafter will remain closed and will prevent the automatic reclosure of the other circuit breaker.

The purpose of the time element of overcurrent relays 17 and 28, whether definite, inverse or inverse with definite minimum limit, is to allow sufficient time for the majority of faults on the low-voltage distribution circuit 10 to burn clear before the circuit breakers 3 and 5 trip open. The longer the time setting of relays 17 and 28 is made, the greater is the likelihood of all low-voltage faults burning clear. However, the longer the time setting of over-current relays 17 and 28 is made, the greater becomes the possibility of injury to the high voltage circuits in the event of a feeder fault. The relays 17 and 28 should accordingly be adjusted for the longest time element consistent with the safety of the high-voltage apparatus, and with a minimum over-current setting sufficiently low to insure both circuit breakers 3 and 5 opening with certainty upon the occurrence of a fault on either feeder 2 or 4.

Figure 2:
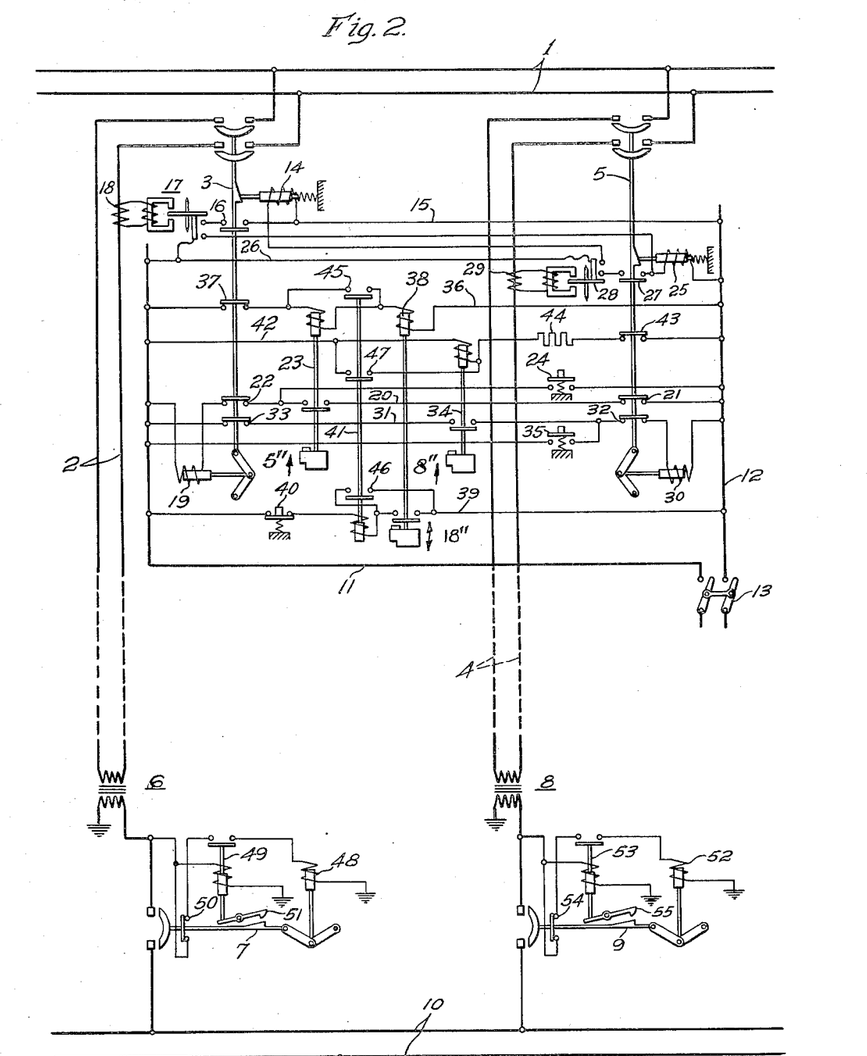
Figs. 2 and 3 are diagrammatic views of modifications of the system shown in Fig. 1.

In Fig. 2 I have shown a modification of the system shown in Fig. 1, which insures the opening of both circuit breakers 3 and 5 upon the occurrence of a fault on either feeder 2 or 4. Fig. 2 is in all respects identical with Fig. 1, except that the over-current relays 17 and 28 are provided with additional contact members which insure the completion of both trip circuits 15 and 26 upon the closure of either overload relay 17 or 28. The operation of the system shown in Fig. 2 will be readily understood from the operation of the system shown in Fig. 1, described above. It will be apparent that in the Fig. 2 modification, by the use of inverse time element operation of over-current relays 17 and 28, both circuit breakers 3 and 5 may be opened quickly in response to a feeder fault, and, because of the current limiting effect of transformers 6 and 8, the circuit breakers 3 and 5 may be held in for a much longer time interval upon the occurrence of a secondary fault, in order to burn the secondary fault clear.

Figure 3:
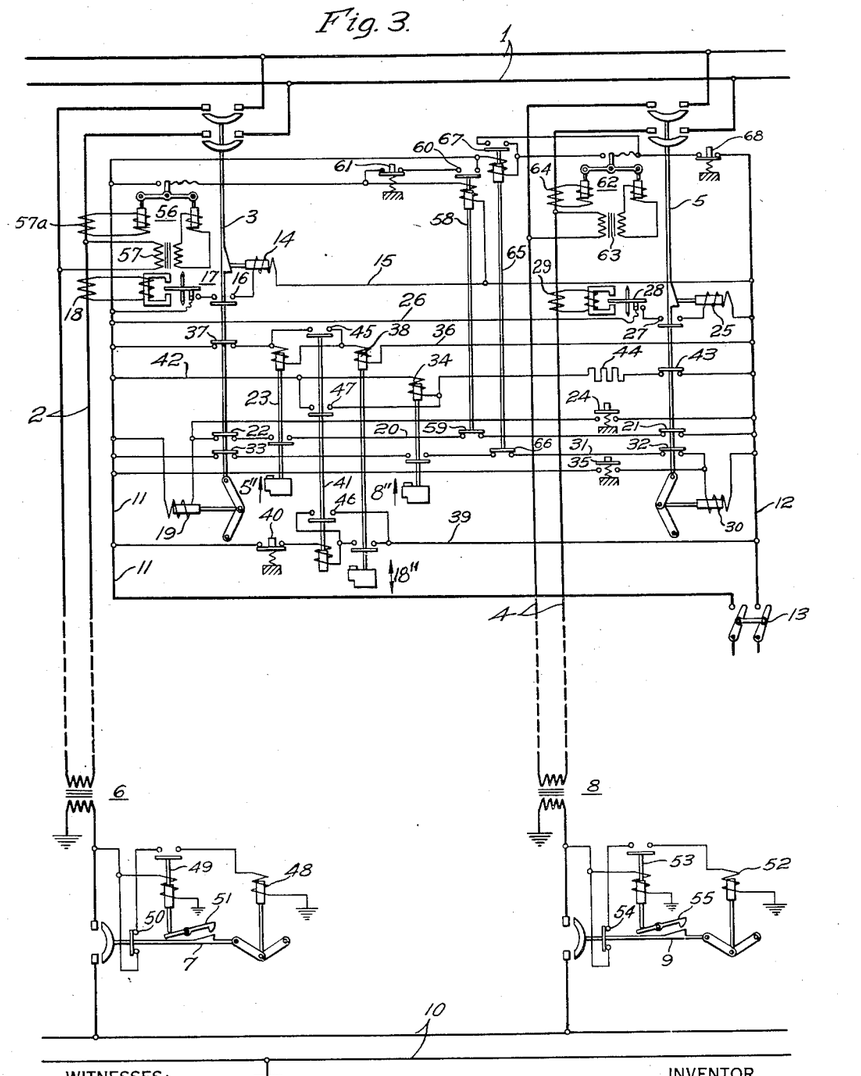

Fig. 3 shows a modification of the system shown in Fig. 1. Referring to Fig. 3, in addition to the elements and circuits described in connection with Fig. 1, a high-speed impedance relay 56, energized from the feeder 2 by means of a voltage transformer 57 and a current transformer 57a is provided. The impedance relay 56 is set to close its contact members when the impedance of the circuit from the supply circuit 1 to the fault falls below a value approximately equal to or less than the normal impedance of the feeder 2. The contact members of the impedance relay 56 are connected to complete a circuit for a relay 58. The relay 58 is provided with back contact members 59 for preventing the completion of closing circuit 20, and with front contact members 60 for completing a holding circuit for itself independent of the impedance relay 56. A push button 61 is provided for interrupting the holding circuit of the relay 58.

A second high-speed impedance relay 62 energized by means of a voltage transformer 63 and a current transformer 64 is provided for the feeder 4. The impedance relay 62 is set to close its contact members when the impedance of the circuit from the supply circuit 1 to the fault falls below a value approximately equal to or less than the normal impedance of the feeder 4. The contact members of the impedance relay 62 are connected to complete a circuit for a relay 65. Similarly to the relay 58, the relay 65 is provided with back contact members 66 for preventing the completion of closing circuit 31, and with front contact members 67 for completing a holding circuit for itself, independent of the impedance relay 62. A push button 68 is also provided for interrupting the circuit of the relay 65.

The operation of the system shown in Fig. 3 may be set forth as follows. Assuming that the circuit breakers 3 and 5 and the network switches 7 and 9 have been closed in the manner described in connection with Fig. 1, and that a fault occurs on feeder 2, the impedance relay 56 immediately closes to energize the relay 58, and the latter closes to interrupt the closing circuit 20 and to establish a holding circuit for itself through its contact members 60. The over-current relays 17 and 28 now operate in the manner described in connection with Fig. 1 to trip open the circuit breakers 3 and 5. The network switches 7 and 9 open in response to the opening of circuit breakers 3 and 5 as described in connection with Fig. 1.

The timing relays 23 and 34, in response to the opening of circuit breakers 3 and 5, operate under control of their respective time element devices toward closed positions. At the expiration of five seconds, the timing relay 23 closes. However, the closure of the timing relay 23 does not complete the closing circuit 20, as the latter is now open at contact members 59 of the relay 58. The circuit breaker 3 accordingly remains open.

At the expiration of an 8 second interval after the opening of circuit breakers 3 and 5, circuit breaker 5 recloses in the manner described in connection with Fig. 1. The reclosure of circuit breaker 5 results in the energization of under-voltage mechanism 53 which acts to close the network switch 9. As a power path clear of the faulty feeder 2 is now provided, the circuit breaker 5 remains closed. The feeder 2 may now be repaired, and the circuit breaker 3 may be closed by operating the push buttons 24 and 61.

It will be apparent from the above, that the impedance relay 56 operates to prevent the automatic re-closure of circuit breaker 3 upon the feeder 2 if a fault exists on the latter. Similarly, the impedance relay 62 prevents the automatic reclosure of the circuit breaker 5 if a fault exists on the feeder 4.

If a fault should occur in the transformer banks 6 or 8 or should a high impedance fault occur on feeder 2 or feeder 4 the impedance relays 56 and 62 would fail to operate. Under these conditions the overload relays 17 and 28 would operate to trip the circuit breakers 3 and 5 and the various re-closing operations described in connection with Fig. 1 would follow.

The various modifications of my invention described above have all been illustrated in connection with systems involving two feeders and two circuit breakers. It will be understood, however, that by providing suitable pallet contact members and interlocking circuits, any of the modifications of the invention described above, may be practiced in systems involving any number of feeders and circuit breakers.

Figure 4:
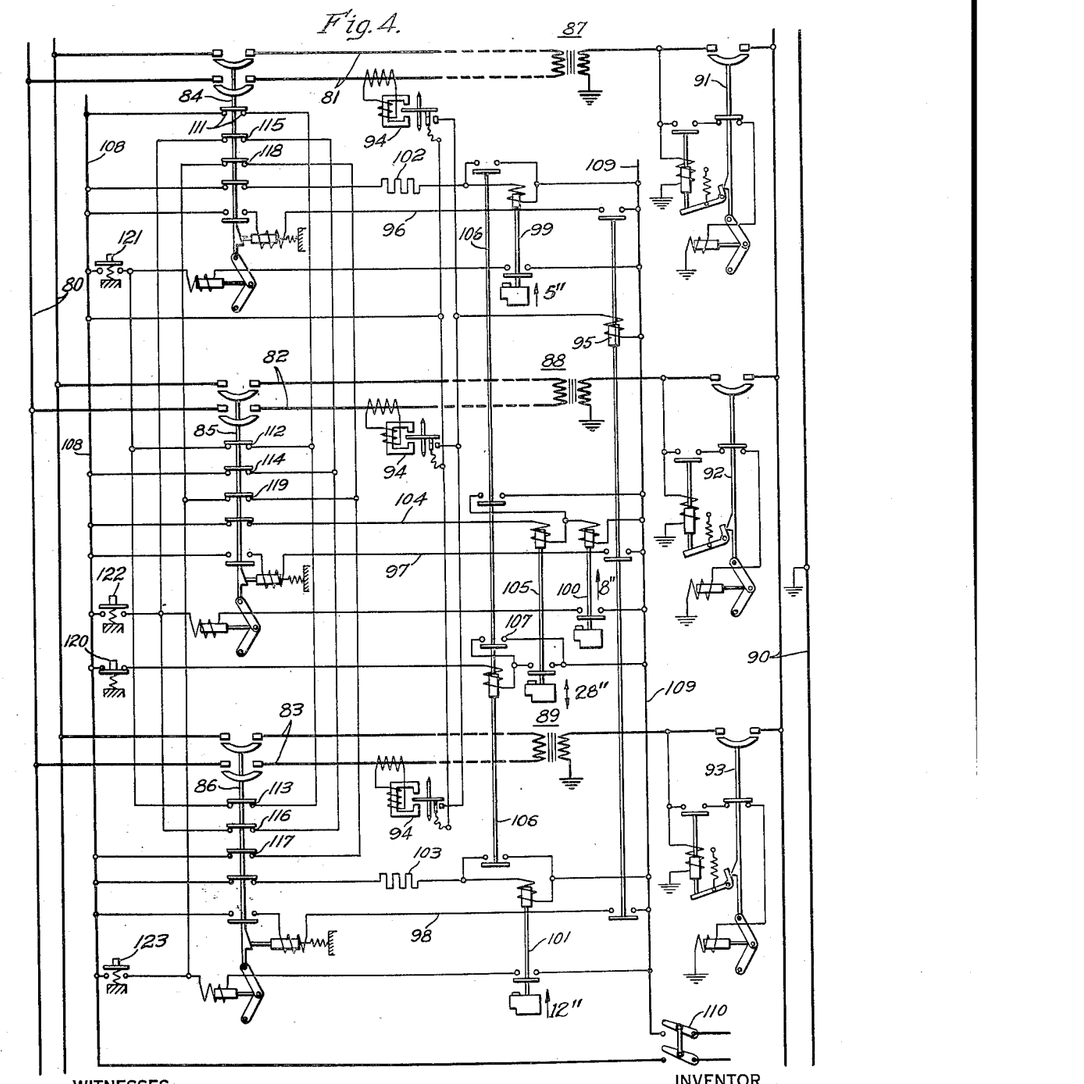
Fig. 4 is a diagrammatic view illustrating the interlocking control circuits used in applying the system of Fig. 1 to the control of three circuit breakers.

In Fig. 4, I have illustrated the application of the modification shown in Fig. 1 to a system involving three feeders and three circuit breakers. As the circuits of Fig. 1 are somewhat modified in Fig. 4, the latter figure will be described in detail.

Referring to Fig. 4, a high voltage supply circuit or station bus 80 may be connected to three feeders 81, 82 and 83 by means of circuit breakers 84, 85 and 86, respectively. The feeders 81, 82 and 83 are connected to the high-voltage sides of banks of transformers 87, 88 and 89 respectively. The low voltage sides of the banks of transformers 87, 88 and 89 are connected through network switches denoted generally by the reference numerals 91, 92 and 93 respectively, to a low-voltage distribution circuit or network 90. The network switches 91, 92 and 93 are of the same character and operate under the same conditions as network switches 7 and 9, described in connection with Fig. 1.

A time-element over-current relay 94 similar to the relays 17 and 28 of Fig. 1, is provided for each of the feeders 81, 82 and 83. The contact members of the over-current relays 94 are connected in parallel in a circuit for a relay 95, which controls the trip circuits 96, 97 and 98 of the circuit breakers 84, 85 and 86, respectively.

Three timing relays 99, 100 and 101, similar to, and controlled in the same manner as, the timing relays 23 and 34 of Fig. 1, are provided for timing the re-closing operations of the circuit breakers 84, 85 and 86 respectively. A resistor 102 is included in the circuit of timing relay 99, for limiting the current in this circuit when the relay coil is short-circuited. A resistor 103, for a similar purpose is included in the circuit of timing relay 101.

The coil of the timing relay 100 is included in a circuit 104 with the coil of a time-delay relay 105, which is provided for controlling a lock-out relay 106. The lock-out relay 106 is provided with contact members for short-circuiting the coils of timing relays 99, 100 and 101, and also with contact members 107 for completing a holding circuit for itself independent of the time-delay relay 105.

The timing relays 99, 100 and 101 are of the delayed-closing, instantaneous-opening type and have different time elements. The time-delay relay 105 is of the delayed-closing delayed-opening type and has a time element longer than that of any of the timing relays 99, 100 or 101. For purposes of illustration, the time element of time relay 99 will be assumed as 5 seconds, the time element of timing relay 100 as 8 seconds, that of timing relay 101 as 12 seconds, and that of time-delay relay 105 as 28 seconds.

A pair of supply conductors 108 and 109, which may be connected to a suitable direct current source (not shown) by means of a switch 110, are provided for supplying the direct current used in the control circuits. The closing circuit of circuit breaker 84 may be traced from supply conductor 108, through back pallet contact members 111 of circuit breaker 84, thence in parallel through back pallet contact members 112 and 113 of circuit breakers 85 and 86 respectively, thence through the closing coil of circuit breaker 84 and contact members of the timing relay 99 to supply conductor 109.

The closing circuit of circuit breaker 85 may be traced from supply conductor 108 through back pallet contact members 114 of circuit breaker 85, thence in parallel through back pallet contact members 115 and 116 of the circuit breakers 84 and 86, respectively, and thence through the closing coil of the circuit breaker 85 and contact members of the timing relay 100 to supply conductor 109.

The closing circuit of the circuit breaker 86 extends from supply conductor 108 through back pallet contact members 117 of circuit breaker 86, thence in parallel through back pallet contact members 118 and 119 of circuit breakers 84 and 85, respectively, and through the closing coil of circuit breaker 86 and contact members of the timing relay 101 to supply conductor 109.

Push buttons 121, 122 and 123, are provided for energizing the closing coils of the circuit breakers 84, 85 and 86, independently of the pallet contact members of the circuit breakers. A normally-closed push button 120 is provided for interrupting the circuit of the lock-out relay 106.

The operation of the apparatus shown in Fig. 4 may be set forth as follows. Upon closure of the switch 110, circuits are completed for all of the timing relays 99, 100 and 101 and for the time-delay relay 105.

At the expiration of a five second interval, the timing relay 99 closes to cause the closure of the circuit breaker 84. At the expiration of an eight second interval after the closure of switch 110, the timing relay 100 closes and causes closure of the circuit breaker 85. At the expiration of twelve seconds after closure of the switch 110, the timing relay 101 closes but fails to energize the closing coil of circuit breaker 86, as the circuit of the latter is now open at pallet contact members 118 and 119 in parallel.

The circuit breaker 86 may now be closed by operation of the push button 123.

Upon the occurrence of a fault which fails to clear itself, on the feeder 81 for example, the operation is as follows. One or more of the over-current relays 94 close to complete a circuit for the relay 95. The relay 95 closes to complete the trip circuits 96, 97 and 98 to thereby trip open the circuit breakers 84, 85 and 86.

In response to the opening of the circuit breakers 84, 85 and 86, the network switches 91, 92 and 93 open, as described in connection with Fig. 1, and circuits are completed for the timing relays 99, 100 and 101 and for the time element relay 105.

At the expiration of a five second interval, the timing relay 99 operates to cause the closure of the circuit breaker 84. The over-current relay 94 associated with feeder 81, however, causes the circuit breaker 84 to again trip open.

At the expiration of eight seconds after the initial opening of the circuit breakers 84, 85 and 86, the timing relay 100 operates to reclose the circuit breaker 85. The latter remains closed as the faulty feeder is now disconnected.

At the expiration of twelve seconds after the initial opening of circuit breakers 84, 85 and 86, the timing relay 101 operates to reclose the circuit breaker 86, and the latter breaker also remains closed. The circuit breaker 84 cannot now be reclosed automatically as the pallet contact members 112 and 113, in parallel in its closing circuit, are now open. The fault on feeder 81 may now be repaired.

Assuming that all of the circuit breakers 84 to 86 are closed and that a fault occurs on feeder 82, the opening and closing sequence is as follows: circuit breakers 84, 85 and 86 trip open; circuit breaker 84 recloses; circuit breaker 85 recloses; circuit breakers 84 and 85 trip open; circuit breakers 84 and 86 reclose and stay closed.

Assuming that all of the circuit breakers 84 to 86 are closed, the opening and closing sequence for a fault on feeder 83 is as follows: circuit breakers 84, 85 and 86 trip open; circuit breaker 84 recloses; circuit breaker 85 recloses.

For a fault involving two or more of the feeders 81 to 83 or a severe fault on the distribution circuit 10, which fails to burn clear, the circuit breakers 84, 85 and 86 will trip open and reclose in the sequence fixed by their timing relays, until the time-delay relay 105, after twenty-eight seconds, closes and completes a circuit for the lock-out relay 106. The lock-out relay 106 then closes to short-circuit the coils of the timing relays 99, 100 and 101 to thereby prevent further automatic reclosures until the push button 120 is operated.

The above-described embodiments of my invention have for simplicity, all been illustrated in connection with single-phase distribution systems. It will be apparent, however, that the invention is equally applicable to polyphase systems. It will also be apparent that, although for simplicity I have shown a single high voltage circuit or station bus for supplying the power transmitted by all the feeders, the invention is applicable to systems in which the power is supplied from a plurality of sources. Although for simplicity I have shown a single transformer and network switch interconnecting each feeder and the distribution network, it will be apparent that any number of transformers and network switches may be connected between each feeder and the network.

I do not intend that the present invention shall be restricted to the specific structural details, arrangement of parts or circuit connections herein set forth, as various modifications thereof may be effected without departing from the spirit and scope of my invention. I desire, therefore, that only such limitations shall be imposed as are indicated in the appended claims.

I claim as my invention:

1. In a distribution system, a network load circuit, a plurality of feeders for supplying power to said load circuit, a plurality of circuit interrupters associated with said feeders for interrupting the flow of power therethrough, fault responsive means for initially opening all of said interrupters and for reopening each of said interrupters after reclosure thereof if a fault exists on its associated feeder, means for automatically reclosing said interrupters in succession regardless of the condition of the corresponding feeders and means effective when all but one of said interrupters are closed for preventing the automatic reclosure of the remaining interrupter regardless of the condition of the corresponding feeder.

2. In a distribution system, a network load circuit, a plurality of feeders for supplying power to said load circuit, a plurality of circuit interrupters associated with said feeders for interrupting the flow of power therethrough, fault responsive means for initially opening all of said interrupters and for reopening each of said interrupters after reclosure thereof if a fault exists on its associated feeder, individual reclosing means for said interrupters including individual time element means for automatically reclosing said interrupters in succession at predetermined time intervals regardless of the condition of the corresponding feeders and means effective when all but one of said interrupters are closed for preventing the automatic reclosure of the remaining interrupter regardless of the condition of the corresponding feeder.

3. In a distribution system, a network load circuit, a plurality of feeders for supplying power to said load circuit, a plurality of circuit interrupters associated with said feeders for interrupting the flow of power therethrough, fault responsive means for initially opening all of said interrupters and for reopening each of said interrupters after reclosure thereof if a fault exists on its associated feeder, means for automatically reclosing said interrupters in a repeating sequence regardless of the condition of the corresponding feeder, and means effective when all but one of said interrupters are closed for preventing the automatic reclosure of the remaining interrupter regardless of the condition of the corresponding feeder.

4. In a distribution system, a network load circuit, a plurality of feeders for supplying power to said load circuit, a plurality of circuit interrupters associated with said feeders for interrupting the flow of power therethrough, fault responsive means for initially opening all of said interrupters and for reopening each of said interrupters after reclosure thereof if a fault exists on its associated feeder, reclosing means for automatically reclosing said interrupters in a repeating sequence regardless of the condition of the corresponding feeders, means effective when all but one of said interrupters are closed for preventing the automatic reclosure of the remaining interrupter regardless of the condition of the corresponding feeder, and means effective after a predetermined number of reclosures of one of said interrupters for rendering said reclosing means ineffective.

5. In a distribution system, a network load circuit, a plurality of feeders for supplying to said load circuit, a plurality of circuit interrupters associated with said feeders for interrupting the flow of power therethrough, fault responsive means for initially opening all of said interrupters and for reopening each of said interrupters after reclosure thereof if a fault exists on its associated feeder, reclosing means for automatically reclosing said interrupters in succession regardless of the condition of the corresponding feeders and for repeatedly reclosing one of said interrupters after each opening thereof, means effective when all but one of said interrupters are closed for preventing the automatic reclosure of the remaining interrupter regardless of the condition of the corresponding feeder, and means effective after a predetermined number of reclosures of said one of said interrupters for rendering said reclosing means ineffective.

6. In a distribution system, a network load circuit, a plurality of feeders for supplying power to said load circuit, a plurality of circuit interrupters associated with said feeders for interrupting the flow of power therethrough, fault responsive means for initially opening all of said interrupters and for reopening each of said interrupters after reclosure thereof if a fault exists on its associated feeder, means for reclosing all of said interrupters regardless of the condition of the corresponding feeders and interlocking means responsive to the open or closed condition of said interrupters for preventing the simultaneous reclosure of a plurality of said interrupters and effective when all but one of said interrupters are closed to prevent the automatic reclosure of the remaining interrupter.

7. In a distribution system, a network load circuit, a plurality of feeders for supplying power to said load circuit, a plurality of circuit interrupters associated with said feeders for interrupting the flow of power therethrough, fault responsive means for initially opening all of said interrupters and for reopening each of said interrupters after reclosure thereof if a fault exists on its associated feeder, means for repeatedly reclosing each of said interrupters after each opening thereof regardless of the condition of the corresponding feeders and interlocking means responsive to the open or closed condition of said interrupters for preventing the simultaneous reclosure of a plurality of said interrupters and effective when all but one of said interrupters are closed to prevent the automatic reclosure of the remaining interrupter.

8. In a distribution system, a network load circuit, a plurality of feeders for supplying power to said load circuit, a plurality of circuit interrupters associated with said feeders for interrupting the flow of power therethrough, fault responsive means for initially opening all of said interrupters and for reopening each of said interrupters after reclosure thereof if a fault exists on its associated feeder, reclosing means for repeatedly reclosing one of said interrupters at the expiration of a predetermined interval of time after each opening thereof regardless of the condition of the corresponding feeder, means for automatically reclosing the remainder of said interrupters regardless of the condition of the corresponding feeders, interlocking means responsive to the open or closed condition of said interrupters for preventing the simultaneous reclosure of a plurality of said interrupters and effective when all but one of said interrupters are closed to prevent the automatic reclosure of the remaining interrupter and means effective after a predetermined number of reclosures of said one of said interrupters for rendering said reclosing means ineffective.

9. In a distribution system, a network load circuit, a pair of feeders for supplying power to said load circuit, a pair of circuit interrupters associated with said feeders for interrupting the flow of power therethrough, fault responsive means for initially opening both of said interrupters upon the occurrence of a fault on either of said feeders and for reopening each of said interrupters after reclosure thereof if a fault exists on its associated feeder, means for automatically reclosing one of said interrupters at the expiration of a predetermined interval of time after opening thereof regardless of the condition of the corresponding feeder, means for automatically reclosing the other of said interrupters at the expiration of a different predetermined interval of time after opening thereof regardless of the condition of the corresponding feeder and means effective when one of said interrupters is closed for preventing the automatic reclosure of the other of said interrupters.

10. In a distribution system, a network load circuit, a pair of feeders for supplying power to said load circuit, a circuit breaker in each of said feeders, fault responsive means for initially opening both of said breakers in response to a fault on either of said feeders and for reopening each of said breakers after reclosure thereof if a fault exists on its associated feeder, reclosing means for repeatedly reclosing one of said circuit breakers at the expiration of a predetermined interval of time after each opening thereof regardless of the condition of the corresponding feeder, reclosing means for repeatedly reclosing the other of said breakers at the expiration of different predetermined intervals of time after each opening thereof regardless of the condition of the corresponding feeder, means effective when one of said breakers is closed for preventing the automatic reclosure of the other of said breakers, and means effective after a predetermined number of reclosures of one of said breakers for rendering both of said reclosing means ineffective.

11. In a distribution system, distribution means comprising a plurality of interconnected circuits, a circuit interrupter associated with one of said circuits for interrupting the flow of power therethrough, time-element fault-responsive means for opening said interrupter in response to a fault on said distribution means, reclosing means for reclosing said interrupter after opening thereof, and high-speed fault-responsive means for rendering said reclosing means ineffective upon the occurrence of a fault on said one of said circuits.

12. In a distribution system, an electric power circuit, a plurality of feeders in power transmission connection with said circuit, a plurality of circuit interrupters associated with said feeders for interrupting the flow of power therethrough, time-element fault-responsive means for opening all of said interrupters in response to a fault on one of said feeders, means for automatically reclosing each of said interrupters after opening thereof and high-speed fault-responsive means for preventing the reclosure of an interrupter associated with a faulty feeder.

13. In a distribution system, power distribution means comprising interconnected circuits, a circuit interrupter associated with one of said circuits for interrupting the flow of power therethrough, time-element current-responsive means for opening said interrupter in response to a fault on said distribution means, reclosing means for reclosing said interrupter after opening thereof, and high-speed impedance-responsive means for rendering said reclosing means ineffective upon the occurrence of a fault on said one of said circuits.

14. In a protective system, an electric power circuit, a plurality of feeders in power transmission connection with said circuit, a plurality of circuit interrupters associated with said feeders for interrupting the flow of power therethrough, time-element current-responsive means for opening all of said interrupters in response to a fault on one of said feeders, means for automatically reclosing each of said interrupters after opening thereof and high-speed impedance-responsive means for preventing the reclosure of an interrupter associated with a faulty feeder.

15. In a distribution system, an electric power circuit, a plurality of feeders in power transmission connection with said circuit, a plurality of circuit interrupters associated with said feeders for interrupting the flow of power therethrough, time-element fault-responsive means for opening said interrupters in response to a fault on one of said feeders, means for automatically reclosing said interrupters in succession, means effective when all but one of said interrupters are closed for preventing the automatic reclosure of the remaining interrupter and high-speed fault-responsive means for preventing the reclosure of an interrupter associated with a faulty feeder.

16. In a distribution system, an electric power circuit, a plurality of feeders in power transmission connection with said circuit, a plurality of circuit interrupters associated with said feeders for interrupting the flow of power therethrough, time-element fault-responsive means for opening said interrupters in response to a fault on one of said feeders and for reopening each of said interrupters if a fault exists on its associated feeder, means for automatically closing said interrupters in succession, means effective when all but one of said interrupters are closed for preventing the automatic reclosure of the remaining interrupter, and high-speed impedance-responsive means for preventing the reclosure of an interrupter associated with a faulty feeder.

17. In a distribution system, an electric power circuit, a plurality of feeders in power transmission connection with said circuit, a plurality of circuit interrupters associated with said feeders for interrupting the flow of power therethrough, time-element fault-responsive means for opening said interrupters in response to a fault on one of said feeders and for reopening each of said interrupters after reclosure thereof if a fault exists on its associated feeder, reclosing means for automatically reclosing said interrupters in a repeating sequence, means effective when all but one of said interrupters are closed for preventing the automatic reclosure of the remaining interrupter, means effective after a predetermined number of reclosures of one of said interrupters for rendering said reclosing means ineffective, and high-speed impedance-responsive means for preventing the reclosure of an interrupter associated with a faulty feeder.

18. In network switch apparatus, main contact members, means for biasing said contact members to open position, latch mechanism for restraining said contact members in closed position against the force of said biasing means, electromagnetic closing means for said contact members and voltage responsive means effective upon energization above a predetermined degree to connect said closing means for energization and effective upon energization below a predetermined minimum degree to trip said latch mechanism.

19. In a distribution system, a network circuit, a plurality of feeders, a plurality of transformers interconnecting said feeders and said circuit, a plurality of circuit breakers in said feeders, a plurality of switches for controlling the connection of said transformers to said circuit, means responsive to an electrical condition of said transformers for closing each of said switches when the corresponding transformer is operatively energized and for opening said switches when said transformers are in a predetermined ineffective condition, fault-responsive means for initially opening all of said breakers and for re-opening each of said breakers after reclosure thereof if a fault exists on its associated feeder, means for automatically reclosing said breakers in succession, and means effective when all but one of said breakers are closed for preventing the automatic reclosure of the remaining breaker.

20. In a distribution system, a network circuit, a plurality of feeders, a plurality of transformers interconnecting said feeders and said circuit, a plurality of circuit breakers in said feeders, a plurality of switches for controlling the connection of said transformers to said circuit, means responsive to an electrical condition of said transformers for closing each of said switches when the corresponding transformer is operatively energized and for opening said switches when said transformers are in a predetermined ineffective condition, fault responsive means for initially opening all of said breakers and for reopening each of said breakers after reclosure thereof if a fault exists on its associated feeder, individual reclosing means for said breakers including individual time element means for automatically reclosing said breakers in a repeating sequence, means effective when all but one of said breakers are closed for preventing the automatic reclosure of the remaining breaker and means effective after a predetermined number of reclosures of one of said breakers for rendering said reclosing means ineffective.

21. In a distribution system, distribution means comprising an electric circuit and a feeder, a transformer interconnecting said feeder and said circuit, a circuit breaker in said feeder, a switch for controlling the connection of said transformer to said circuit, means responsive to an electrical condition of said transformer for closing said switch when said transformer is operatively energized and for opening said switch when said transformer is in a predetermined ineffective condition, time-element fault-responsive means for opening said breaker in response to a fault on said distribution means, reclosing means for reclosing said breaker after opening thereof, and high-speed fault-responsive means for rendering said reclosing means ineffective upon the occurrence of a fault on said feeder.

22. In a distribution system, a network circuit, a plurality of feeders, a plurality of transformers interconnecting said feeders and said circuit, a plurality of circuit breakers in said feeders, a plurality of switches for controlling the connection of said transformers to said circuit, means responsive to an electrical condition of said transformers for closing each of said switches when the corresponding transformer is operatively energized and for opening said switches when said transformers are in a predetermined ineffective condition, time-element fault-responsive means for opening all of said breakers in response to a fault on one of said feeders, means for automatically reclosing each of said breakers after opening thereof, and high-speed fault-responsive means for preventing the reclosure of a breaker associated with a faulty feeder.

JOHN S. PARSONS.